(12) United States Patent
Jackson

(10) Patent No.: US 12,108,741 B1
(45) Date of Patent: Oct. 8, 2024

(54) PET LEASH SECURING DEVICE

(71) Applicant: Jaifanon Jackson, Durham, NC (US)

(72) Inventor: Jaifanon Jackson, Durham, NC (US)

( * ) Notice: Subject to any disclaimer, the term of this patent is extended or adjusted under 35 U.S.C. 154(b) by 0 days.

(21) Appl. No.: 18/629,016

(22) Filed: Apr. 8, 2024

Related U.S. Application Data

(60) Provisional application No. 63/470,233, filed on Jun. 1, 2023.

(51) Int. Cl.
*A01K 27/00* (2006.01)

(52) U.S. Cl.
CPC .......... *A01K 27/003* (2013.01); *A01K 27/005* (2013.01)

(58) Field of Classification Search
CPC .............................. A01K 27/003; A01K 27/005
See application file for complete search history.

(56) References Cited

U.S. PATENT DOCUMENTS

| | | | |
|---|---|---|---|
| 3,867,905 A | 2/1975 | Vail, Jr. | |
| 4,019,463 A * | 4/1977 | Kitchen | A01K 27/003 |
| | | | 119/793 |
| 4,398,500 A * | 8/1983 | Koronkiewicz | A01K 27/005 |
| | | | 119/793 |
| 5,174,246 A | 12/1992 | Driver | |
| 5,329,675 A | 7/1994 | McLean et al. | |
| 5,462,019 A | 10/1995 | Hong-Rong et al. | |
| 5,732,662 A * | 3/1998 | Jacobsen | A01K 27/003 |
| | | | 119/798 |
| 6,053,129 A * | 4/2000 | Akre | A01K 27/005 |
| | | | 119/799 |
| 6,095,094 A * | 8/2000 | Phillips | A01K 27/005 |
| | | | 119/792 |
| 6,438,802 B1 * | 8/2002 | Beeman | A01K 27/003 |
| | | | 24/135 R |
| 9,433,188 B2 | 9/2016 | Cuthbertson et al. | |
| 10,918,090 B2 * | 2/2021 | Haarburger | A01K 27/008 |
| 2011/0277700 A1 * | 11/2011 | Friedland | E05B 73/0005 |
| | | | 70/58 |
| 2013/0174616 A1 * | 7/2013 | Allen, Jr. | A01K 27/001 |
| | | | 119/793 |
| 2014/0224188 A1 | 8/2014 | Upah et al. | |

(Continued)

FOREIGN PATENT DOCUMENTS

| | | | | |
|---|---|---|---|---|
| GB | 2361166 A | * | 10/2001 | ........... A01K 27/004 |
| GB | 2376864 A | | 12/2002 | |

(Continued)

*Primary Examiner* — Kristen C Hayes
(74) *Attorney, Agent, or Firm* — Bold IP PLLC; Binita Singh

(57) ABSTRACT

A leash with an integrated leash securing device having a cord member, with a retention member on a distal end and a handle formed on a proximal end. The leash securing device is integrated on the leash with the cord member passing through the leash securing device and the handle is formed by forming a loop with the proximal end of the cord member returning into the leash securing device. An end of the handle within the leash securing device is secured via a fastener inserted through the leash securing device pushing the handle portion within the leash securing device against a surface of the leash securing device. The leash securing device includes a clasping element and an ergonomic feature that allow a one-handed use to secure a pet, that is on the leash, to a fixed object allowing an owner to be hands free.

19 Claims, 9 Drawing Sheets

(56) References Cited

U.S. PATENT DOCUMENTS

| | | | |
|---|---|---|---|
| 2016/0073613 A1* | 3/2016 | Chappell | A01K 27/004 |
| | | | 119/797 |
| 2016/0165849 A1 | 6/2016 | Lewis | |
| 2021/0381542 A1 | 12/2021 | Peterson | |
| 2022/0125016 A1* | 4/2022 | Tao | A01K 27/003 |
| 2022/0330526 A1 | 10/2022 | Lee et al. | |

FOREIGN PATENT DOCUMENTS

| | | | |
|---|---|---|---|
| GB | 2413928 A | 11/2005 | |
| WO | WO-0007436 A1 * | 2/2000 | A01K 27/005 |

* cited by examiner

PET LEASH SECURING DEVICE

CROSS-REFERENCE TO RELATED APPLICATIONS

This application is a non-provisional application which claims priority to U.S. Provisional Application No. 63/470,233 filed on Jun. 1, 2023, which is incorporated by reference in its entirety.

FIELD OF THE DISCLOSURE

The present invention relates to a new apparatus for securing a pet leash to an object. More specifically, the present invention relates to an apparatus that allows a pet leash to be secured and released quickly.

BACKGROUND

Throughout human history, pets have been an integral part of human lives. Pets, such as dogs, require daily walks for their toilet needs and exercise. Pets, become a part of the family, and may often travel with the owner. On any of these excursions, especially in public areas, the owner is required to be always in control of the pet for safety of the pet as well as others.

An owner will use a leash to be in control of the pet. Dogs are the most common pets seen on a leash. However, the existing options of leashes are not ideal for securing a pet to a fixed object so that an owner does not have to hold the leash while in the vicinity of the secured pet. The problems with existing leashes are several, including that they have to be tied around/knotted to a fixed object or the leashes have a device on them that requires a code or a lock allowing the leash to be looped around an object and locked into place. These leashes can be difficult to work with. Knotting a leash around an object may not work with all types of leashes and it can take time to knot and unknot. The leashes with a lock or code device integrated on them are adapted to prevent theft of the pet, and these leashes require either having a key on a person or remembering a code.

Accordingly, there is a need for an improvement and alternative to the existing leashes which can be secured around a fixed object quickly and easily.

SUMMARY OF THE INVENTION

The present invention relates to a novel and unique leash with a leash securing device that can be used to secure a pet on a leash to a fixed object. The leash can be encircled around a fixed object and pushed into the leash securing device. In one or more non-limiting embodiments, the present invention relates to a leash that comprises a cord member, a retention member that connects to a collar on a pet, a leash securing device, and a handle portion. The cord member extends between a proximate end and a distal end, wherein the proximate end loops around to form a handle. The proximate end of the cord member that forms the handle is connected to the leash securing device. The distal end is connected to the retention member. Thus, a person would be holding the leash at the handle and the pet would be attached to the leash by the retention member. The leash securing device includes a clasping element which is formed by a curved rigid element and a clasp element which allow the cord member to be pushed into when wanting to secure the pet to a fixed object. Additionally, an ergonomic feature is integrated on the leash securing device, positioned below the clasping element, which allows a one-handed operation of the leash securing device, where a person would push down on the clasp element to insert the leash into the rigid element.

Other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
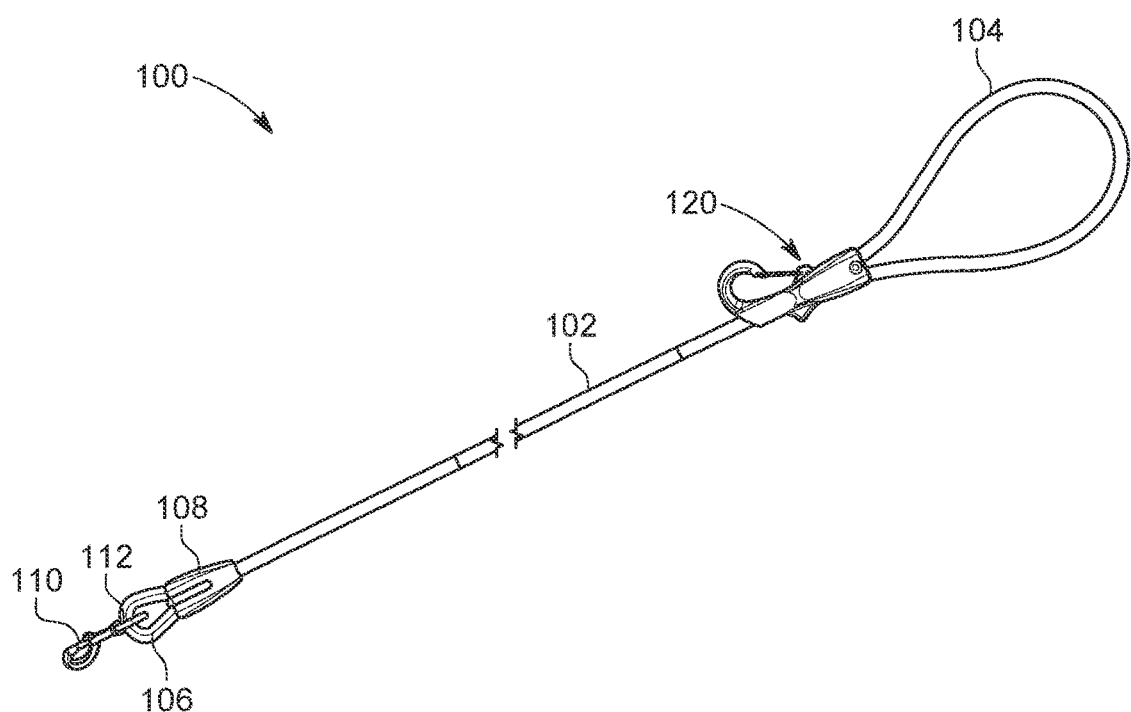
FIG. 1 is a pictorial illustration of a perspective view of a leash with a leash securing device in accordance with an illustrative embodiment.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The present description is drawn to an innovative leash securing device. The leash securing device is integrated on a leash. The leash securing device is used to secure a pet, that is on the leash, to a fixed object allowing an owner to be hands free. In one or more non-limiting embodiments, the leash securing device as described herein solves many of the problems associated with existing leashes, especially for those in the pet owner community who take their pets out on walks or on excursions that require the pet owner to secure a pet to a fixed object so that the owner has use of their hands to accommodate other activities. The problems with existing leashes are several, including that they must be tied around (or knotted) to a fixed object. In other instances, the leashes may have a device on them that requires a code or a lock allowing the leash to be looped around an object and locked into place. These leashes can be difficult to work with. Knotting a leash around an object may not work with all types of leashes and it can take time to knot and unknot. The leashes with a lock or code device integrated on them are adapted to prevent theft of the pet, and these leashes require either having a key on a person or remembering a code.

Accordingly, there is a need for a leash securing device that is part of a leash which allows the leash to be looped around a fixed object and secured in place with quick and easy movements. The innovative leash securing device can be used around varying sized fixed objects. A user can advantageously wrap the leash, having the leash securing device, around a fixed object while holding a handle portion of the leash and place a portion of the leash through the leash securing device. In one or more non-limiting embodiments, such a leash securing device is described below with reference to the Figures.

Turning to the figures, FIG. 1 is a pictorial illustration of a leash 100 integrated with a leash securing device 120 according to one or more non-limiting embodiments. The leash 100 is generally used to secure a pet, such as a dog to a fixed object. The leash 100 comprises of a cord member 102, a retention member 110, and the leash securing device 120. The cord member 102 extends between a proximate end and a distal end, wherein the proximate end loops around to form a handle 104. The proximate end of the cord member 102 that forms the handle 104 is connected to the leash securing device 120. The distal end is connected to the retention member 110. The terms "proximate" and "distal" are used in the context of a person holding the leash 100. Thus, a person would be holding the leash 100 at the handle 104, which is formed by looping the proximate end; and the pet would be attached to the leash by the retention member 120, which is at the distal end of the person holding the leash 100.

As noted above, the leash 100 is used to hold a pet by connecting to a pet collar on the pet. Thus, the cord member 102 extends between a pet and a person holding the leash to allow control of the pet. The cord member 102 can come in various shapes, sizes, and materials. For example, the rope member may be fabricated from any material used for manufacturing a leash such as, and not limited to, a nylon webbing, cotton webbing, polypropylene webbing, and a metal chain. In FIG. 1, an example of the cord member 102 is shown to be fabricated from a round cord. The cord member 102 can have a length that is common in the industry and must have a length that allows the cord member 102 to be encircled around a fixed object that can generally be encountered when outside, such as a post, a chair leg, and others. It is contemplated that the cord member may be provided in various lengths, for example, between 3 feet to 8 feet. However, a person skilled in the arts can appreciate that other lengths may be useful as well.

FIG. 1 illustrates that the rope member 102 is looped at both the distal end and the proximal end. The distal end of the rope member 102 has a small loop 106 that is formed by placing the distal end through a distal cover 108, that has a hollow cavity, and the distal end is looped back into the distal cover 108 and sewn. The distal cover 108 hides the stitching and helps secure the distal end. The small loop 106 is formed to capture or hold the retention element 110. Essentially, the retention element 110 includes a ring 112 that is placed through the distal end of the rope member 102 and the distal end is looped to capture and hold the ring 112 on the retention element 110. The retention element 110 is like a clasp and can be removably connected to a pet collar. It is to be understood that the retention element 110 can be any element known in the art that clasps onto a pet collar.

Figure 2:
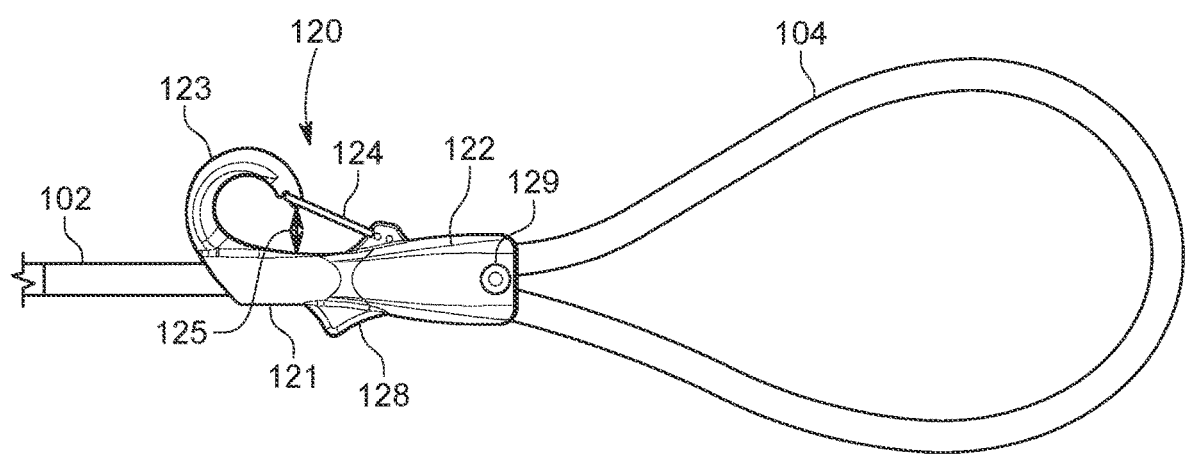
FIG. 2 is a pictorial illustration of a closeup view of a leash securing device of the leash shown in FIG. 1 in accordance with an illustrative embodiment.
Figure 3:
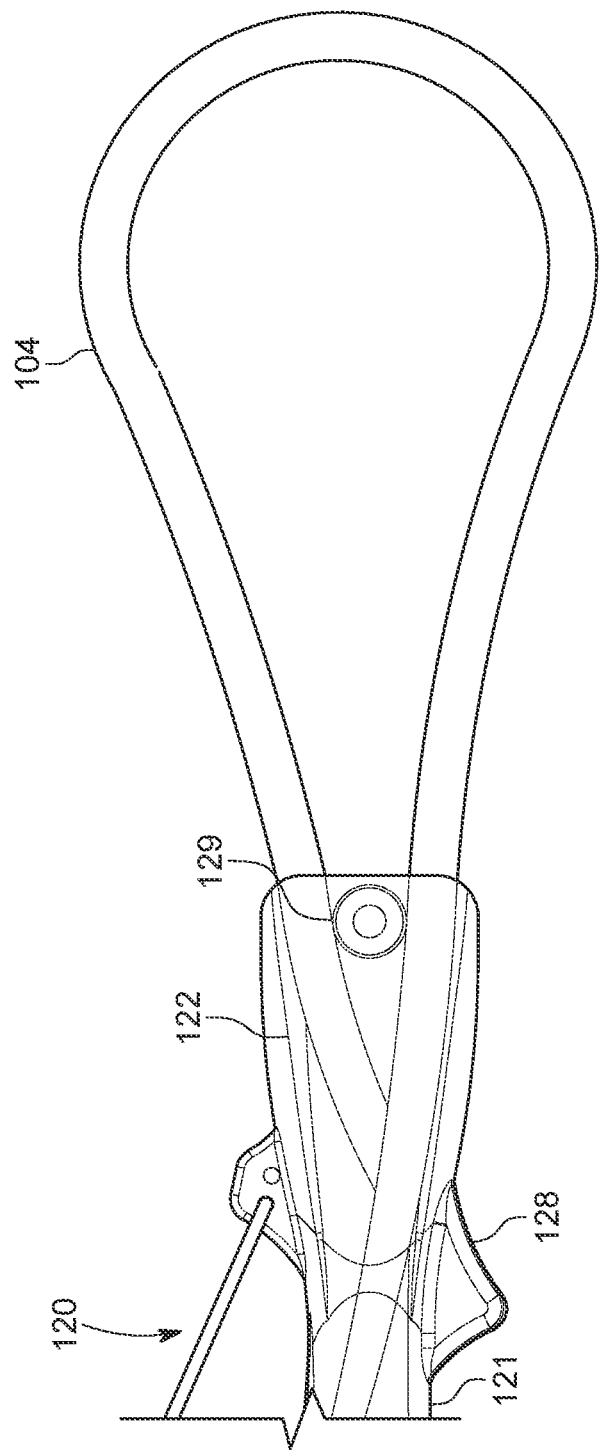
FIG. 3 is a pictorial illustration of an internal view of the leash securing device to illustrate the handle portion within the leash securing device in accordance with an illustrative embodiment.

FIGS. 1 and 2 also illustrate that the handle 104 is created on the proximal end of the rope member 102 by a larger loop. The handle 104 is also formed by looping and sewing the proximal end of the rope member 102. The size difference in the small loop 106 and the handle 104 is apparent in FIG. 1 and the larger loop of the handle 104 is used to hold the leash 100. For example, the handle 104 may be secured around a user's wrist. As best seen in FIG. 2, the handle 104 is formed in conjunction with the leash securing element 120 which covers the stitching used to form the handle 104. Additionally, the leash securing device 120 secures the proximal end of the rope member 102 to form the handle 104.

Figure 4:
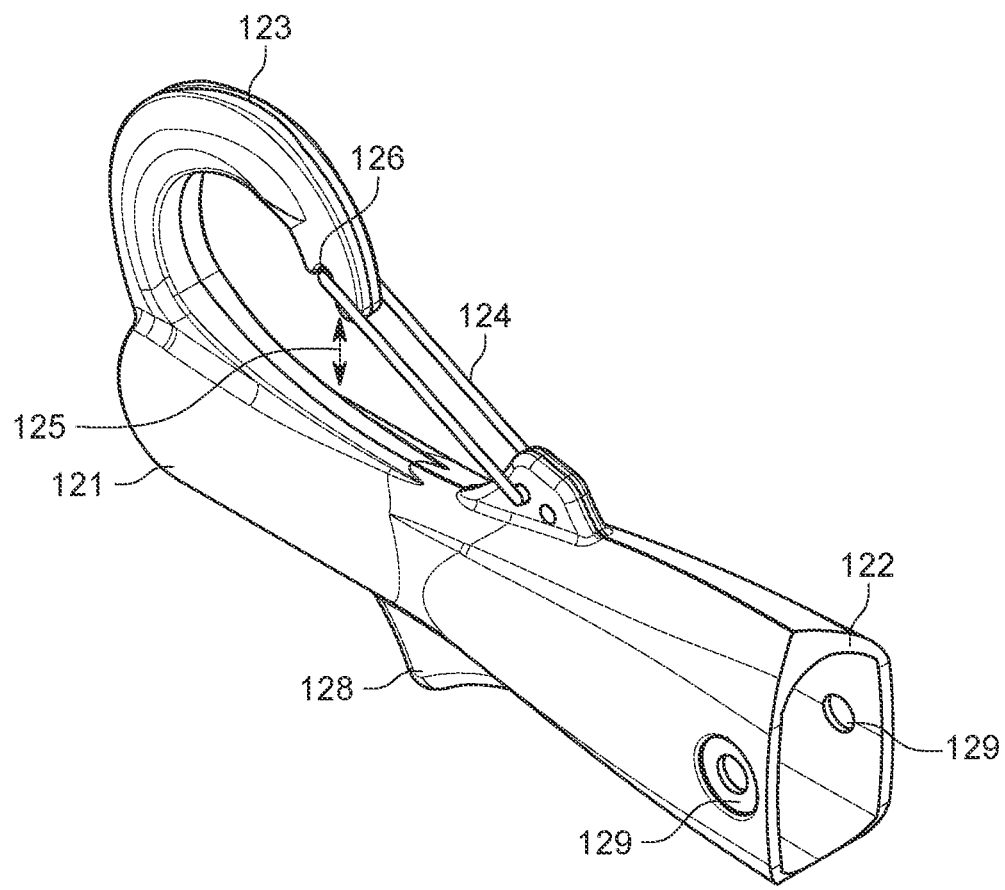
FIG. 4 is a pictorial illustration of the leash securing element only, without the leash, in accordance with an illustrative embodiment.
Figure 5:
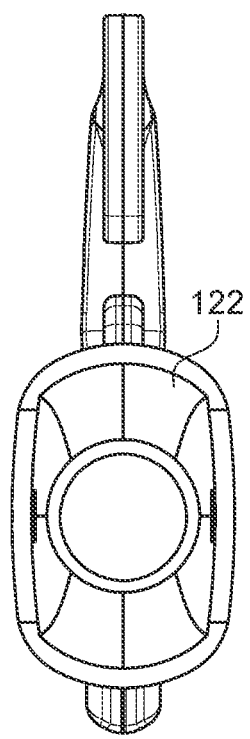
FIG. 5 is a pictorial illustration of a front view of a main body of the leash securing device in accordance with an illustrative embodiment.
Figure 6:
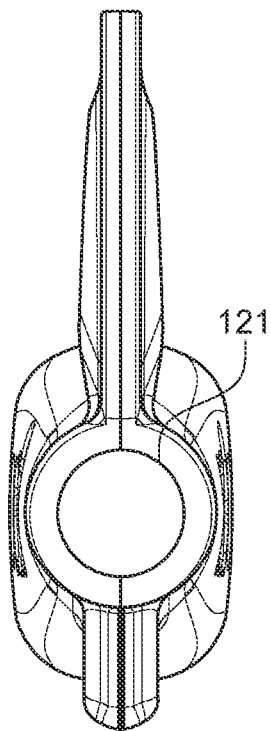
FIG. 6 is a pictorial illustration of a front view of a central shaft of the leash securing device in accordance with an illustrative embodiment.

Referring to FIGS. 2, 3, 5, and 6, the handle 104 is formed by taking the proximal end of the cord member 102 and passing it through the leash securing device 120 and looping the proximal end back into the leash securing device 120. The leash securing device 120 has a main body 122 and a central shaft 121, which are both hollow. FIG. 5 illustrates a front view of the main body 122, and FIG. 6 illustrates a front view of the central shaft 121. The main body 122 has a wider opening and narrows toward the central shaft 121 which has a tubular shape for accommodating the cord member 102. The main body 122 and the central shaft 121 will generally have a shape that corresponds with a shape of the cord member 102 that is fitted within the leash securing device 120. The proximal end of the cord member 102 is passed through the central shaft 121, through the main body 122 and looped back into the main body 122 and attached onto itself to form the handle 104. The main body 122 is proximal to the handle 104. The main body 122 also includes an aperture 129, which is used for a fastener, such as a bolt, to be inserted through the main body 122 where the handle 104 is formed. Essentially, the aperture 129 with the screw is positioned near the end of the main body 122 to secure the proximal end of the cord member 102 within the main body 122. As seen in FIG. 4, the aperture 129 is included on both sides of the main body such that a screw may be positioned through the main body to secure the handle 104 within the main body 122. This way, the screw that is positioned through the aperture 129 pushes the folded over handle 104 portion against the main body 122. Accordingly, the combination and positioning of the central shaft 121 and the main body 122 relative to an axis of the cord member 102 placed through the central shaft 121 and the main body 122 allows a user to place one hand through the handle 104 to hold the main body 122 with that one hand.

Also seen in FIG. 2, the leash securing element 120 includes a clasping feature, which comprises a rigid element 123 and a clasp element 124. The rigid element 123 is integrated onto the central shaft 121. The rigid element 123 is curved extending outward from the central shaft 121 and curving back toward the central shaft 121 but not touching the central shaft 121 and leaving an opening 125 wide enough for the rope member 102 to be pulled through. The opening 125 is closed by the clasp element 124, which may be a spring-loaded clasp element. A spring-loaded end of the clasp element 124 is connected to the main body 122, and the clasp element 124 extends toward the rigid element 123 and closes the opening 125 by pushing into a grooved portion 126 on the rigid element 123. The grooved portion 126 is best seen in FIGS. 4 and 7.

Figure 7:
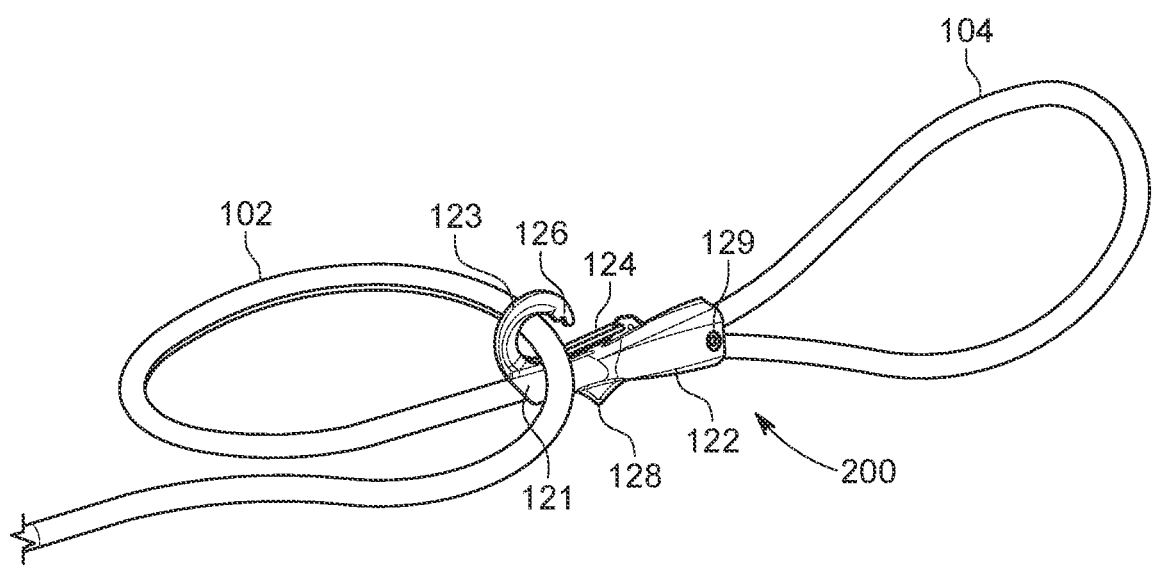
FIG. 7 is a pictorial illustration of a rope element being looped through the leash securing element in accordance with an illustrative embodiment.
Figure 8:
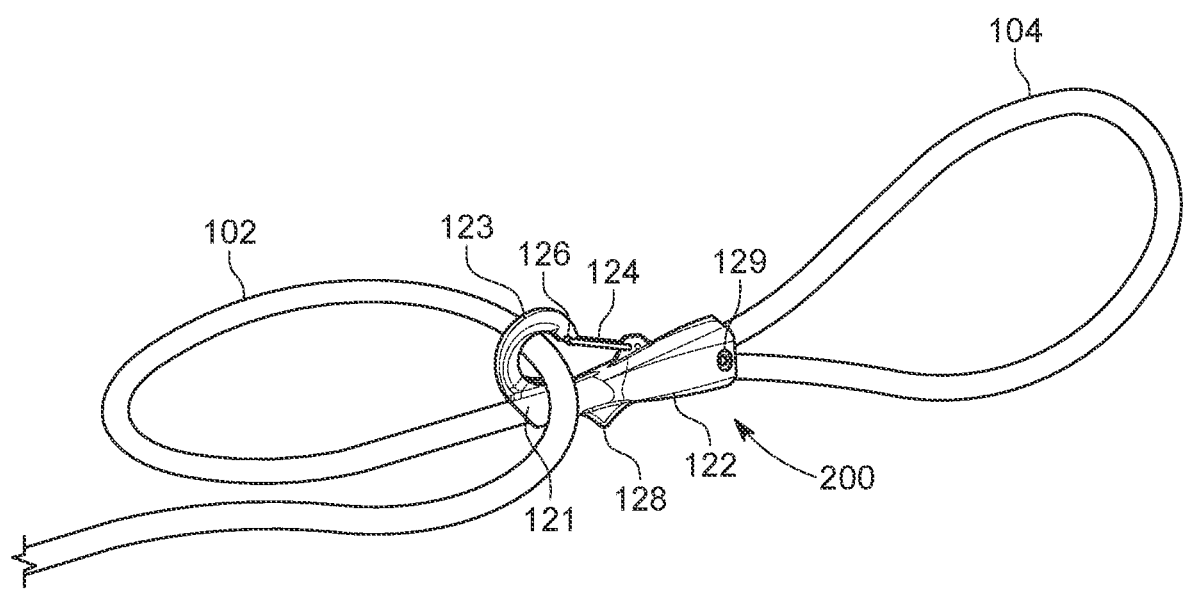
FIG. 8 is a pictorial illustration of the rope element looped through the leash securing element and in a secured position in accordance with an illustrative embodiment.
Figure 9:
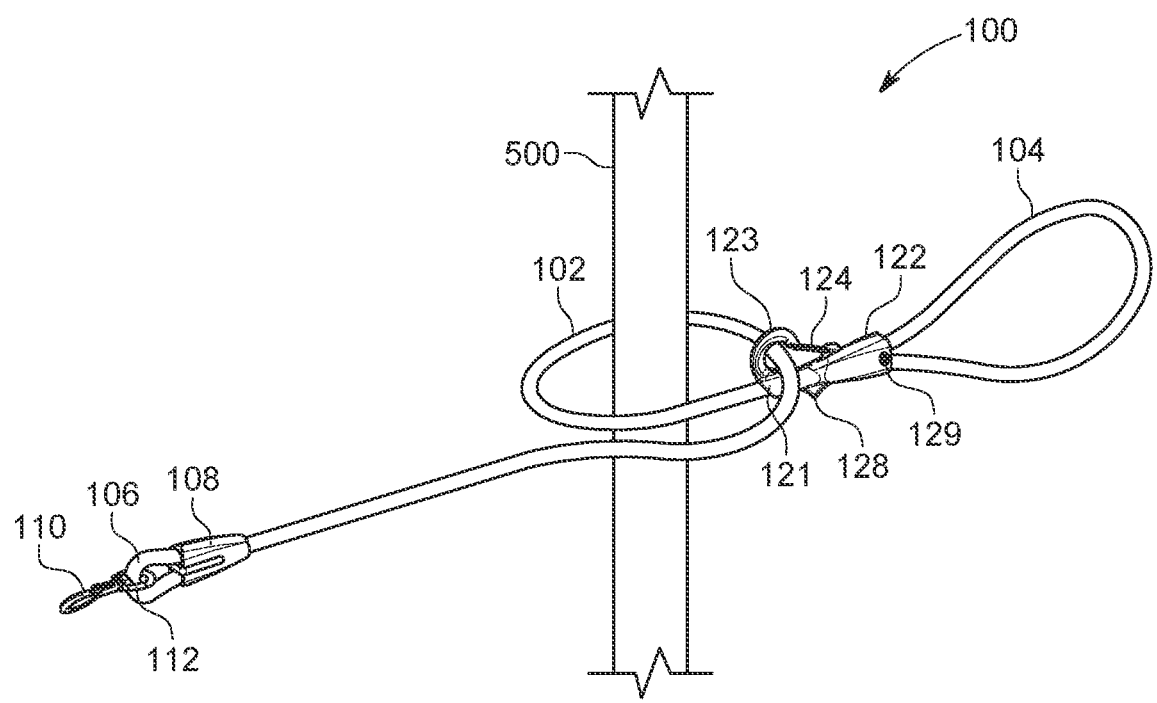
FIG. 9 is a pictorial illustration of the leash in FIG. 1 secured to a fixed object in accordance with an illustrative embodiment.

Referring to FIGS. 7 to 9, when wanting to secure a pet to a fixed object 500, the cord member 102 is encircled around the fixed object 500 and placed into the rigid element 123 of the leash securing device 120 through the opening 125. A downward pressure is applied to the clasp element 124 by pushing down on the clasp element 124 toward the body of the leash securing device 120. The downward pressure moves the clasp element 124 out of the grooved portion 126 on the rigid element 123 and toward the central shaft 121 creating the opening 125 to allow the cord member 102 to be pulled through. Once the cord member 102 is pulled into the rigid element 123, the downward pressure on the clasp element 124 is released whereby the clasp element 124 returns to the grooved portion 126 and closes the opening 125 to retain the rope member 102. The curvature of the rigid element 123 is shaped in such a way to intentionally retain the rope member 102 against the curve of the rigid element 123 and is discouraged from applying force to the clasp element 124 when the cord member 102 is under tension. Additionally, the cord member 102 is prevented from snagging on the clasp element 124 because of the grooved portion 126 holding an end of the clasp element 124.

An ergonomic feature 128 is formed on the main body 120 and is positioned relatively opposite of the rigid element 123 and the clasp element 124. As best seen in FIG. 2, the ergonomic feature 128 protrudes outward from the main body 122 and is configured to allow a user holding the handle 104 of the leash 100 to place a finger against the ergonomic feature 128. The ergonomic feature 128 is shown to be triangular in shape to allow a finger to be placed against it. When a user holds a leash 100 as such, with finger placed against the ergonomic feature 128, a stronger and more comfortable position is attained. Additionally, the ergonomic feature 128 provides a user with a more comfortable positioning to press down on the clasp element 124 when placing the cord member 102 against the rigid element 123.

As mentioned above, the combination of the features integrated on the main body 122 (rigid element 123, clasp element 124, and ergonomic feature 128) which are positioned relative to the axis of the rope member 102 through the central shaft 121 and the main body 122, allow a user to position a hand through the handle 104 and hold the main body 122 with one hand. Further, the user can place a finger against the ergonomic feature 128 to provide a better hold on the leash securing device 120 when applying downward pressure on the clasp element 124 to encircle the rope member through or remove from within the leash securing device 120.

Figure 10A:
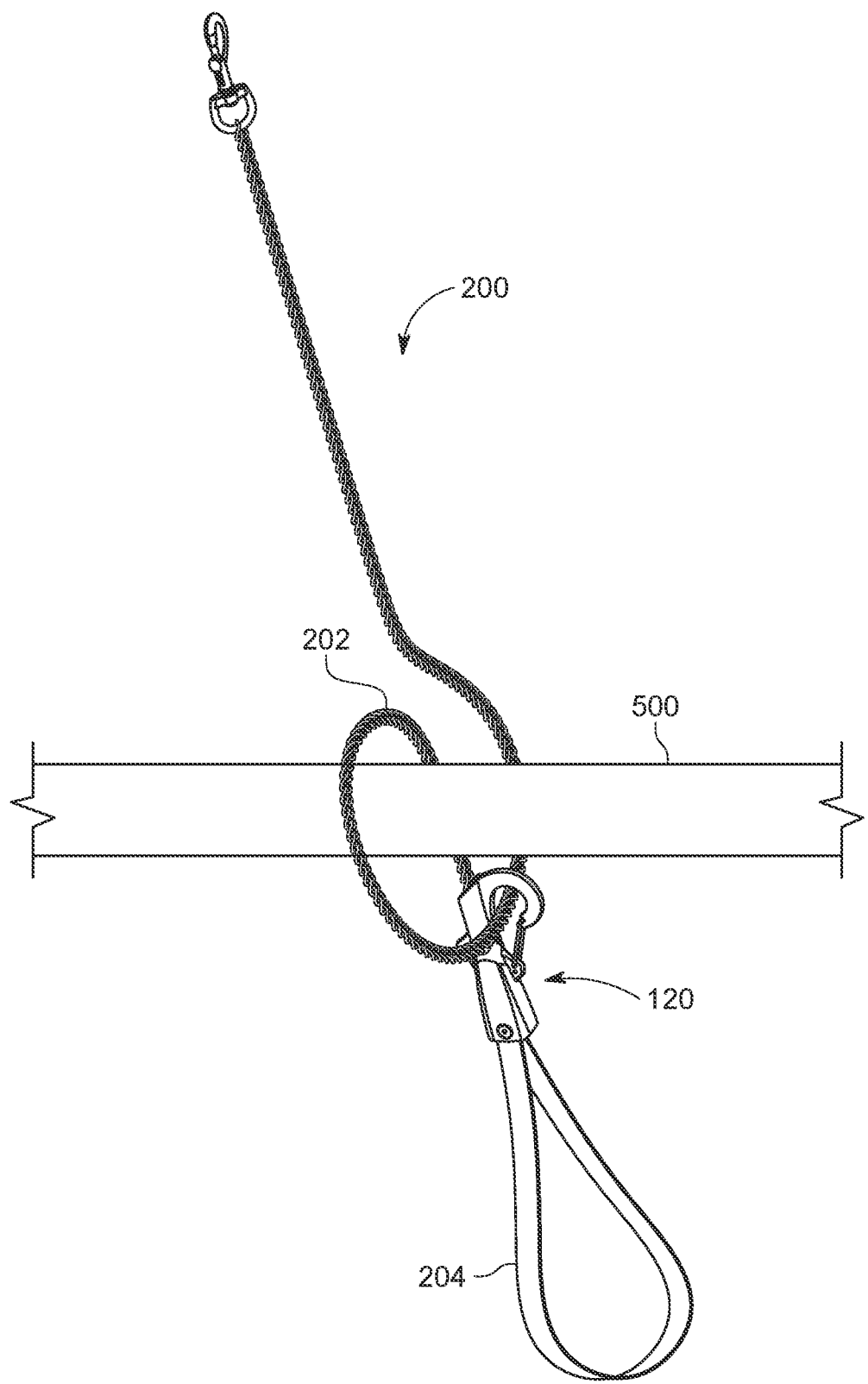
FIG. 10A is a pictorial illustration of an alternative embodiment of a leash secured to a fixed object, wherein the leash is integrated with the leash securing device, in accordance with an illustrative embodiment.
Figure 10B:
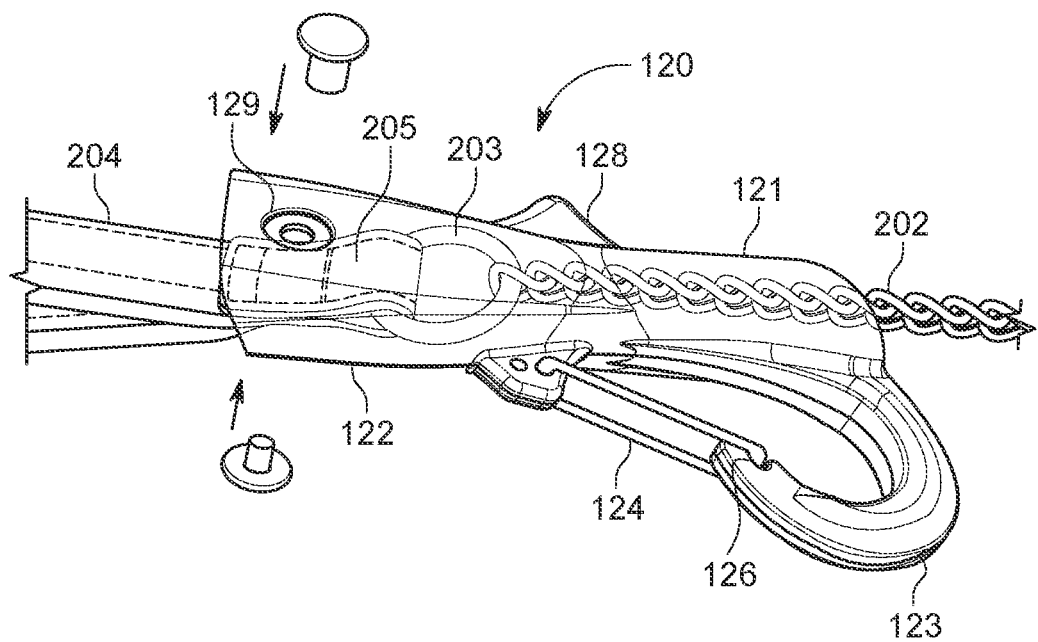
FIG. 10B is a pictorial illustration of a close-up internal view of the leash securing illustrating a handle connection to a cord member of the leash shown in FIG. 10 above in accordance with an illustrative embodiment.

FIGS. 10A and 10B illustrate an example of a cord member 202 and a handle 204 that are not a single piece. This embodiment is an example of a leash 200 that includes a separate handle 204 and a separate cord member 202 that are adjoined. The cord member 202 and handle 204 can be fashioned from the same material or be of different materials. In the example shown, the cord member 202 is shown to be fashioned of a metal chain and the handle 204 is fashioned of a different material. In this example, the handle 204 is attached to the cord member 202 inside the leash securing device 120. The leash securing device 120 is identical to the leash securing device 120 described above in relation to the example with the cord member 102 that is fashioned from a round cord where the handle 104 and the cord member 102 are one piece. The handle 204 has a loop section 205 which is connected to a ring 203. The ring 203 is connected to the cord member 202. The loop section 205 is positioned within the main body 122 of the leash securing device 120. The handle 204 is secured inside the leash securing device 120 with a bolt inserted through the aperture 129 and into the loop section 205. This holds the handle securely in place and allows the cord member 202 to connect to the handle 204 via the ring 203. The cord member 202 extends out from the central shaft 121 of the leash securing device 120. The leash 200 is wrapped around an object similarly as described above.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A leash, comprising:
   a cord member having a proximal end and a distal end;
   a retention member connected to the distal end of the cord member;
   a leash securing device having a central shaft and a main body, wherein the main body has an opening that is wider than an opening in the central shaft; and
   wherein the proximal end of the cord member passes through the central shaft and the main body, and loops back into the main body to attach to the cord member in the main body forming a handle.

2. The leash of claim 1, wherein the central shaft and main body of the leash securing device are hollow to accommodate the cord member.

3. The leash of claim 1, wherein the main body and the central shaft have a shape that correspond with a shape of the cord member.

4. The leash of claim 1, wherein the opening in the main body narrows toward the central shaft.

5. The leash of claim 1, wherein an aperture traverses through the main body, wherein a fastener is positioned through the aperture such that the fastener is positioned proximal to a position wherein the proximal end of the cord member is attached to the cord member in the main body, whereby the fastener pushes the cord member against the main body to secure the handle.

6. The leash of claim 1, wherein the leash securing device includes a clasping feature having a rigid element and a clasp element which are integrated on a surface above the central shaft, wherein the rigid element extends outward away from the central shaft before curving back toward the central shaft, wherein an opening is created between the central shaft and a tip of the rigid element which is closed by the clasp element, wherein the clasp element has a spring-loaded end attached to the surface of the central shaft.

7. The leash of claim 6, wherein the tip of the rigid element includes a grooved portion wherein an end of the clasp element, opposite the spring-loaded end, fits into the grooved portion of the rigid element when the clasp element closes the opening.

8. The leash of claim 6, wherein the clasp element is moved away from the tip of the rigid element by pressing into the clasp to expose the opening between the rigid element and the central shaft of the leash securing device.

9. The leash of claim 1, wherein the leash securing device includes an ergonomic feature which protrudes outward from the main body, wherein the ergonomic feature is integrated below a clasping element along an axis of the leash securing device.

10. A leash, comprising:
    a cord member having a proximal end and a distal end;
    a retention member connected to the distal end of the cord member;
    a leash securing device having a central shaft and a main body, wherein the main body has an opening that is wider than an opening in the central shaft, and the opening in the main body narrows toward the central shaft; and
    wherein the proximal end of the cord member passes through the central shaft and connects to a handle in the main body.

11. The leash of claim 10, wherein the central shaft and the main body of the leash securing device are hollow to accommodate the cord member and a looped section of the handle.

12. The leash of claim 11, wherein the looped section of the handle includes a ring, wherein the proximal end of the cord member is connected to the ring within the leash securing device.

13. The leash of claim 10, wherein the main body and the central shaft have a shape that correspond with a shape of the cord member.

14. The leash of claim 10, wherein the cord member and the handle are fashioned of the same material or alternatively fashioned of different material.

15. The leash of claim 10, wherein an aperture traverses through the main body, wherein a fastener is positioned through the aperture such that the fastener is inserted through a section of the handle that is positioned within the main body, thereby securing the handle to the leash securing device.

16. The leash of claim 10, wherein the leash securing device includes a clasping feature having a rigid element and a clasp element which are integrated on a surface above the central shaft, wherein the rigid element extends outward away from the central shaft before curving back toward the central shaft, wherein an opening is created between the central shaft and a tip of the rigid element, wherein the opening is closed by the clasp element which has a spring-loaded end attached to the surface of the central shaft.

17. The leash of claim 16, wherein the tip of the rigid element includes a grooved portion wherein an end of the clasp element, opposite the spring-loaded end, fits into the grooved portion of the rigid element when the clasp element closes the opening.

18. The leash of claim 16, wherein the clasp element is moved away from the tip of the rigid element by pressing into the clasp element to expose the opening between the rigid element and the central shaft of the leash securing device.

19. The leash of claim 10, wherein the leash securing device includes an ergonomic feature which protrudes outward from the main body, wherein the ergonomic feature is integrated below a clasping element along an axis of the leash securing device.

* * * * *